United States Patent
Marggraff et al.

(10) Patent No.: US 11,366,997 B2
(45) Date of Patent: Jun. 21, 2022

(54) SYSTEMS AND METHODS TO ENHANCE INTERACTIVE ENGAGEMENT WITH SHARED CONTENT BY A CONTEXTUAL VIRTUAL AGENT

(71) Applicant: KINOO, Inc., Mountain View, CA (US)

(72) Inventors: Lewis James Marggraff, Lafayette, CA (US); Nelson George Publicover, Bellingham, WA (US)

(73) Assignee: KINOO, INC., Mountain View, CA (US)

( * ) Notice: Subject to any disclaimer, the term of this patent is extended or adjusted under 35 U.S.C. 154(b) by 0 days.

(21) Appl. No.: 17/233,473

(22) Filed: Apr. 17, 2021

(65) Prior Publication Data

US 2021/0390364 A1    Dec. 16, 2021

Related U.S. Application Data

(63) Continuation-in-part of application No. 17/200,722, filed on Mar. 12, 2021, which is a
(Continued)

(51) Int. Cl.
*G06N 3/00*     (2006.01)
*G10L 15/22*    (2006.01)
(Continued)

(52) U.S. Cl.
CPC .............. *G06N 3/006* (2013.01); *G10L 15/22* (2013.01); *H04N 21/43076* (2020.08); *H04N 21/44008* (2013.01); *H04N 21/44218* (2013.01)

(58) Field of Classification Search
CPC ........ G06N 3/006; G06N 3/0454; G06N 3/08; G10L 15/22; H04N 21/43076;
(Continued)

(56) References Cited

U.S. PATENT DOCUMENTS

| 2003/0037068 A1* | 2/2003 | Thomas | ........... H04N 21/44222 |
| 2008/0163204 A1* | 7/2008 | Morgan | .............. G06F 9/45533 718/1 |

(Continued)

*Primary Examiner* — Benjamin R Bruckart
*Assistant Examiner* — Tien M Nguyen
(74) *Attorney, Agent, or Firm* — William A. English; Vista IP Law Group LLP

(57) ABSTRACT

Systems and methods are described to enhance interactive engagement during simultaneous delivery of serial or digital content (e.g., audio, video) to a plurality of users. A machine-based awareness of the context of the content and/or one or more user reactions to the presentation of the content may be used as a basis to interrupt content delivery in order to intersperse a snippet that includes a virtual agent with an awareness of the context(s) of the content and/or the one or more user reactions. This "contextual virtual agent" (CVA) enacts actions and/or dialog based on the one or more machine-classified contexts coupled with identified interests and/or aspirations of individuals within the group of users. The CVA may also base its activities on a machine-based awareness of "future" content that has not yet been delivered to the group, but classified by natural language and/or computer vision processing. Interrupting the delivery of content substantially simultaneously to a group of users and initiating dialog regarding content by a CVA enhances opportunities for users to engage with each other about their shared interactive experience.

22 Claims, 9 Drawing Sheets

Related U.S. Application Data continuation-in-part of application No. 17/081,806, filed on Oct. 27, 2020, now Pat. No. 10,963,816, which is a continuation-in-part of application No. 16/902,168, filed on Jun. 15, 2020, now Pat. No. 10,915,814.

(60) Provisional application No. 63/106,296, filed on Oct. 27, 2020, provisional application No. 63/043,060, filed on Jun. 23, 2020.

(51) Int. Cl.
    *H04N 21/442* (2011.01)
    *H04N 21/44* (2011.01)
    *H04N 21/43* (2011.01)

(58) Field of Classification Search
    CPC ....... H04N 21/44218; H04N 21/44008; H04N 21/42203; H04N 21/4223; H04N 21/4333; H04N 21/466; H04N 21/4788; H04N 21/4394
    See application file for complete search history.

(56) References Cited

U.S. PATENT DOCUMENTS

| | | | |
|---|---|---|---|
| 2013/0125153 A1* | 5/2013 | Hilson | H04N 21/2393 725/5 |
| 2017/0103754 A1* | 4/2017 | Higbie | G06F 3/167 |

* cited by examiner

SYSTEMS AND METHODS TO ENHANCE INTERACTIVE ENGAGEMENT WITH SHARED CONTENT BY A CONTEXTUAL VIRTUAL AGENT

RELATED APPLICATION DATA

The present application is a continuation-in-part of co-pending application Ser. No. 17/200,722, filed Mar. 12, 2021, which claims benefit of provisional application Ser. No. 63/106,296, filed Oct. 27, 2020, and is a continuation-in-part of Ser. No. 17/081,806, filed Oct. 27, 2020, now U.S. Pat. No. 10,963,816, which claims benefit of provisional application Ser. No. 63/043,060, filed Jun. 23, 2020, and is a continuation-in-part of application Ser. No. 16/902,168, filed Jun. 15, 2020, now U.S. Pat. No. 10,915,814, the entire disclosures of which are expressly incorporated by reference.

FIELD OF THE INVENTION

The present invention relates generally to systems and methods for enhancing the delivery of shared audiovisual content by interspersing a virtual agent (VA) based on labelled, and/or a determined in real-time, awareness of the composition and/or intent (i.e., context) of the content and/or user reactions. Systems and methods utilize techniques within the fields of computer programming, telecommunications, machine learning, and human-machine interactions. Derived awareness of context of audio data may deploy systems that perform automatic speech recognitions (ASR) and natural language processing (NLP). Derived awareness of video data context may employ machine vision classification schemes that typically include convolution neural networks (CNNs). The formation of virtual agent responses may include the use of natural language generation (NLG) and speech synthesis as well as methods used, for example, within entertainment and gaming industries (so-called "gaming engines") to align movements with the laws of physics. Human-machine interactions may also use techniques within the cognitive sciences including psychology and linguistics. Systems and methods may provide users with intuitive machine interfaces that express an awareness of the emotional and/or cognitive context of delivered content and/or users.

BACKGROUND

The present invention makes use of recent advances in the fields of machine learning related to ASR, NLP, NLG, and image recognition. At the core of these approaches is an ever-expanding range of configurations of artificial neural networks (ANNs) including so-called deep learning approaches. ANNs of various geometries, connectivities, and transfer functions may be configured to optimize classifying functions for different applications, desired accuracies, and levels of data complexity. There are a number of platforms available to set up, train, and test ANNs including TensorFlow, Keras, PyTorch, Caffe, Theano, and MXNET. When deployed, modern day computers and mobile devices even include multi-core hardware designed to accelerate such neural network-based computations.

The development of machine-based "understanding" of text, images, and/or sounds is rooted in seminal work by Alan Turing in 1950. To this day, the so-called Turing test is used as one criterion for evaluating levels of machine-based abilities to (at least) mimic human behavior. Although there is profuse and ongoing debate about whether machines can "simulate thinking" versus "actually think", advances in fields related to artificial intelligence (AI) facilitate modern-day human-machine interactions with, for example, chatbots and virtual agents (also referred to as intelligent or interactive virtual agents, or personal assistants). Chatbots are currently deployed, for example, within restricted interactive environments (e.g., voice-only, confined range of topics) to provide phone or instant-message based inquiry-routing and/or customer service.

Human-machine interactions based on speech may be processed using automatic speech recognition (ASR) and/or natural language understanding (NLU). ASR processing may convert filtered (i.e., to reduce noise) phonemes into text, words and/or keywords. Natural language processing (NLP) and/or NLU typically use multiple parallel deep learning strategies to take such text and/or text acquired, for example, from a document or display to parse groups of words according to grammatical norms of the language being used, identify parts of speech (e.g., noun, verb, adjective) and identify concepts from key words. More advanced ASR/NLP systems use so-called "active learning" to expand vocabulary and adapt to new ways of speaking about various topics. Such approaches are also one aspect of adapting to the speech patterns of an individual user.

Along parallel lines, current art within the field of computer vision can be used to identify content (e.g., foreground objects, background) within images. One step to identify objects within images is the formation of bounding areas (usually rectangular boxes or polygons) that locate one or more objects (e.g., using a single shot multibox detector, SSD). Classifying content within images is dominated by the use of various forms of convolution neural networks (CNNs). A key aspect of CNN approaches is an independence of the identification of objects from their location(s) and/or orientation(s) within a visual field. Supervised learning may be used to train neural networks using labeled object datasets that may additionally (optionally) be improved and expanded by unsupervised learning of untagged image/video data. Modern-day classification of objects within video data streams often deploy CNNs that include embedded memory functions to take advantage of the serial nature of video data.

The systems and methods herein also make use of recent advances in fields related to machine-based generation of virtual assistants or virtual agents (VAs). Largely reversing the steps described above for discerning content from audio and/or video data, a VA may be generated using natural language generation (NLG) followed by speech synthesis or text-to-speech (TTS) approaches. Most current NLG processors convert content and/or data interpretation into a form of grammatically structured, human-readable text. Such text may, in turn, be used as an input to a TTS system where various attributes (e.g., gender, dialect, robotic sound) may be applied to modulate outputs.

If a VA is presented as an animated character or other articulated form, movements may be dictated by laws of physics and/or biomechanics, or at least a subset of physical principles applied to such forms. Motion graphic design may use movement "engines" and other tools developed primarily within the gaming and entertainment industries. Such animations may be applied over a wide range of scales of complexity, from simple geometric figures all the way to complex animal forms that, for example, even include movements of hair, skin and other detailed attributes.

Human-machine interactions using VAs may be enhanced by a machine-based awareness of the environments and/or contexts of individuals. As interactions with remote individuals become increasingly screen-based, a contextual awareness of shared screen (and other interaction devices) content may aid both the effectiveness and acceptance of such VAs. New paradigms are required to monitor and react to such shared contextual environments.

SUMMARY

In view of the foregoing, systems and methods are provided herein for enhancing interactive engagement involving a plurality of individuals consuming serial (e.g., audio, video) or digital content. The invention relates generally to utilizing a machine-based awareness of the "context" of content and/or at least one of the interacting individuals within the group and, at appropriate times, interspersing content that includes a shared, "contextual" virtual agent (CVA). The composition and/or intent of content (i.e., content context) may be assessed in real time and/or based on a previously assigned contextual labeling. Reactions of the one or more individuals within the group (i.e., individual context) may also be ascertained in real time and/or based on previously specified preferences, viewpoints, interests and/or other aspects related to the individual.

By interspersing a CVA at appropriate times (e.g., so as to minimize interruption and/or maximize content flow), for all participants substantially simultaneously, opportunities for human-to-human and humans-to-machine interactions may be enhanced. In addition to synchronizing awareness and activities among participants, an interspersed CVA may help increase active engagement related to the content, increase interactive engagement with others sharing the viewing and/or listening experience, encourage dialog (or, at least cause participants to think) about contextual topics, identify common interests and aspirations, and/or provide transitional content when context changes or is about to change.

One particularly useful aspect of the systems and methods herein is as an interactional tool to help members of a group become more aware of the cognitive and emotional contexts (e.g., interests, fears, aspirations) of members within the group. Shared viewing and/or listening to content at substantially the same time, even if separated by some distance, is (in itself) an aspect of socializing during group interaction. However, when members of a group are unaware or unappreciative of the particular preferences, interests, or other aspects of members (i.e., individual contexts), there may be lost opportunities to explore (together) these topics areas.

In further exemplary embodiments, when such individual contexts have been identified (e.g., previously specified by the one or more individuals) and compared with contexts that arise during the viewing of content, one or more matches in such classifications may generate opportunities to interrupt the serial content at opportune times. An interspersed CVA may then produce dialog pointing out identified context(s) and/or associations among various contexts to the entire group.

The pausing of serial content and subsequently initiating a shared CVA performance based on the context for pausing (e.g., user reaction, previously identified interests or preferences) may be executed with or without directly identifying the one or more individuals or sources that triggered the pause. Whether to reveal the identity of a user whose preferences, viewpoints, and/or reactions lead to the pause in content may depend on individual user and/or group preferences. CVA interjections may take advantage of the tendency of most individuals to initiate conversations with others about topics they are interested in. On the other hand, it may be preferable for the CVA to allow others (i.e., other than the individual(s) who triggered the pause in content delivery) to initiate dialog regarding topics that have been flagged as producing, for example, fear or trepidation.

Within exemplary embodiments, an aspect of the systems and methods concerns when to pause the delivering of serial content in order to intersperse content that includes a CVA. In broad terms, a pause may be triggered by: 1) a pause signal specifically indicated by one or more users and/or labelling within (including datasets associated with) the content, 2) one or more identified contexts classified within the content (where the serial content may or may not have been presented to the group of users at the time of the pause), and/or 3) one or more identified reactions classified from responses by one or more individuals within the group of users to the presenting of the content. Times to intersperse content that includes a CVA may also, for example, take into account other contextual and/or interaction aspects such as individual or group deadlines, the time since a previous pause and/or overall frequency of pauses, since, for example, too many interruptions may rapidly become annoying.

The actions and/or articulations of a "contextual" virtual agent included as a component of interspersed content may include one or more "contexts" based on: 1) one or more previously specified preferences, viewpoints, interests, or other aspects of an individual (i.e., individual contexts) within the group, 2) one or more contexts identified within the serial content (i.e. content contexts) presented substantially simultaneously to the group, 3) one or more identified reactions (i.e., reaction contexts) by one or more individuals during the substantially simultaneous consumption of the content, and/or 4) one or more contexts identified within the serial content not yet (at the time of the pause) presented to the group of individuals (i.e., ensuing contexts). The latter category of contents (i.e., ensuing contexts) allows the CVA to anticipate and/or introduce "future" context(s) to the group of participants (who have not yet experienced the content).

As described in greater detail within the Detailed Description of the Exemplary Embodiments, the term "substantially simultaneously" is being used to indicate a general temporal alignment of actions within a plurality of electronic devices (and their users); however, such actions may not occur at precisely synchronous times due to factors such as transmission delays, computational processing times, and so on, but are still considered substantially simultaneously as used herein. Also, as noted below, the singular forms "a," "an," and "the" include plural referents unless the context clearly dictates otherwise.

In accordance with an exemplary embodiment, a method is provided to encourage human engagement that includes: providing a plurality of electronic devices, each electronic device comprising a processor, an output device operatively coupled to the processor, and a sensor operatively coupled to the processor; delivering, substantially simultaneously on output devices of all of the electronic devices, serial content; detecting, by one or more of one or more processors of the electronic devices and one or more sensors of the electronic devices, a pause indication; pausing substantially simultaneously on the output devices, the delivering of the serial content; determining by the one or more processors, one or more serial content contexts coincident with the pausing of the delivering of the serial content; and initiating by a virtual agent generated on the output devices using the one or more processors, an interaction with one or more humans based on the one or more serial content contexts.

In accordance with another exemplary embodiment, a method is provided to encourage human engagement that includes: providing a plurality of electronic devices, each electronic device comprising a processor, and an output device operatively coupled to the processor; delivering substantially simultaneously on output devices of all of the electronic devices, serial content; determining by the one more processors, one or more serial content contexts; determining by one or more processors, that the one or more serial content contexts match one or more predetermined contexts; pausing substantially simultaneously on the output devices, the delivering of the serial content; and initiating by a virtual agent generated on the output devices using the one or more processors, an interaction with one or more humans based on the one or more serial content contexts.

In accordance with yet another exemplary embodiment, a method is provided to encourage human engagement that includes: providing a plurality of electronic devices, each electronic device comprising a processor, an output device operatively coupled to the processor, and a sensor operatively coupled to the processor; delivering substantially simultaneously on output devices of all of the electronic devices, serial content; acquiring from an interaction with one or more humans, interaction data from one or more sensors; classifying from the interaction data, using one or more processors, one or more content reactions by the one or more humans; determining by the one or more processors, that the one or more content reactions match one or more predetermined reactions; pausing substantially simultaneously on the output devices, the delivering of the serial content; and initiating by a virtual agent generated on the output devices using the one or more processors, an interaction with the one or more humans based on the one or more content reactions.

In accordance with another exemplary embodiment, a method is provided to encourage human engagement that includes: providing a plurality of electronic devices, each electronic device comprising a processor, an output device operatively coupled to the processor, and a sensor operatively coupled to the processor; displaying, substantially simultaneously on output devices of all of the electronic devices, serial content; detecting, by one or more of one or more processors of the electronic devices and one or more sensors of the electronic devices, a pause indication; pausing substantially simultaneously on the output devices, the displaying of the serial content; determining by the one or more processors, one or more ensuing serial content contexts following the pausing of the displaying of the serial content; and initiating by a virtual agent generated on the output devices using the one or more processors, an interaction with one or more humans based on the one or more ensuing serial content contexts.

In accordance with yet another exemplary embodiment, a method is provided to encourage human engagement that includes: providing a plurality of electronic devices, each electronic device comprising a processor, and an output device operatively coupled to the processor; displaying, substantially simultaneously on output devices of all of the electronic devices, serial content; determining by one or more processors, from the serial content, one or more serial content contexts; determining by the one or more processors, that the one or more serial content contexts match one or more predetermined contexts; pausing substantially simultaneously on the output devices, the displaying of the serial content; determining by the one or more processors, from the serial content, one or more ensuing serial content contexts following the pausing of the displaying of the serial content; and initiating by a virtual agent generated on the output devices using the one or more processors, an interaction with one or more humans based on the one or more ensuing serial content contexts.

In accordance with another exemplary embodiment, a method is provided to encourage human engagement that includes: providing a plurality of electronic devices, each electronic device comprising a processor, an output device operatively coupled to the processor, and a sensor operatively coupled to the processor; displaying, substantially simultaneously on output devices of all of the electronic devices, serial content; acquiring from an interaction with one or more humans, interaction data from one or more sensors; classifying from the interaction data, using one or more processors, one or more content reactions by the one or more humans; determining by the one or more processors, that the one or more content reactions match one or more predetermined reactions; pausing substantially simultaneously on the output devices, the displaying of the serial content; determining by the one or more processors, one or more ensuing serial content contexts following the pausing of the displaying of the serial content; and initiating by a virtual agent generated on the output devices using the one or more processors, an interaction with the one or more humans based on the one or more ensuing serial content contexts.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the Detailed Description of the Exemplary Embodiments when considered in connection with the following illustrative figures. In the figures, like-reference numbers refer to like-elements or acts throughout the figures. Presented exemplary embodiments are illustrated in the accompanying drawings, in which.

DETAILED DESCRIPTION OF THE EXEMPLARY EMBODIMENTS

Figure 1A:
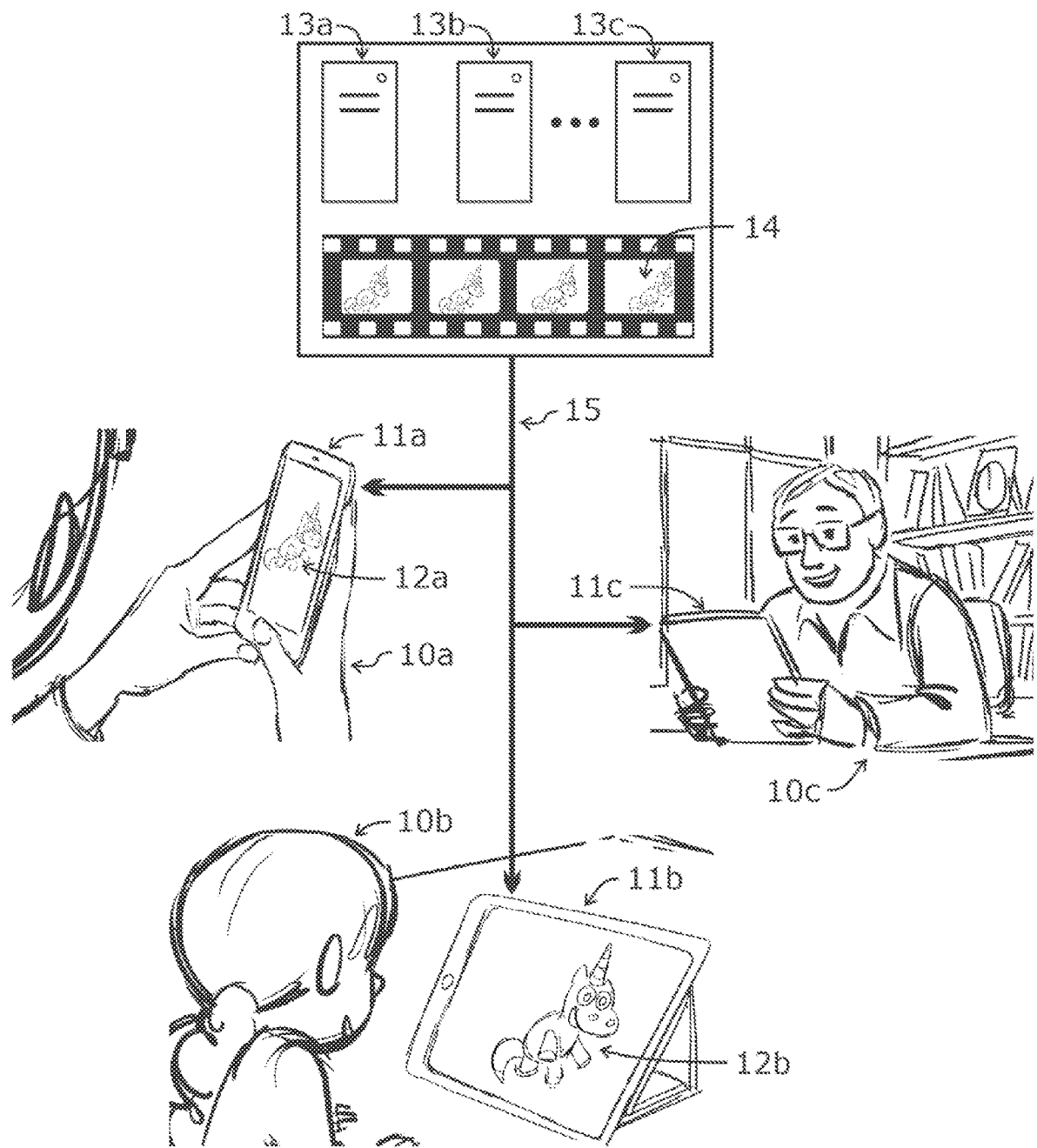
FIG. 1A shows scenes from a scenario in which three (3) individuals simultaneously view serial content (i.e., a cartoon animation involving movement of a unicorn) on their respective display devices.

Before the exemplary embodiments are described, it is to be understood that the invention is not limited to particular embodiments described herein, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Within descriptions herein, the term "substantially simultaneously" is used to describe the performing of actions including delivering serial content, pausing the delivery of content, and generating a CVA that may include audio and/or video components to facilitate human interactions. "Substantially simultaneously" signifies that, although systems and methods may strive to perform such actions simultaneously, resultant interactions with a plurality of humans may not occur precisely simultaneously. Such temporal differences may arise as a result of a number of factors including transmission delays when sending or receiving content (particularly to devices at remote locations), differences in processing capabilities (e.g., to decompress audio and video data) at different interaction sites, brief transmission interruptions that may accumulate to further reduce group synchrony, different buffering capacities by (particularly video) devices designed to reduce the effects of such brief interruptions, and so on.

Thus, actions that are intended to result in simultaneous interaction may typically differ by up to several seconds. Under extreme conditions (e.g., a prolonged transmission delay or interruption of power somewhere within the chain of content delivery), the systems and methods may detect the presence of significant asynchrony and take steps to re-synchronize interactions (e.g., by pausing content delivery by the one or more device that are ahead of others). A measured delay when this occurs may be pre-assigned by developers. A typical asynchrony that might trigger such actions may be in the range of thirty (30) seconds. If such delays occur repeatedly and/or if asynchrony becomes even greater within a range in the order of five (5) minutes, an overall interactive session may be interrupted to allow corrective actions. Such actions may be indicated to users as a "time out" condition.

The present invention relates generally to systems and methods for enhancing human engagement during delivery of serial content substantially simultaneously to a plurality of users by interspersing content that includes an interactive virtual agent (VA) that may possess a machine-based awareness of the composition and/or intent of the serial content (i.e. content context) including content that has not yet been presented to users (ensuing content), reactions of one or more individuals within the group (i.e. reaction context), and/or preferences of one or more individuals (i.e., individual context) within the group. As described more fully in the Summary above, the CVA may be viewed as an omni-present monitor, identifying contextual topics within content (i.e., both presented content and content that is about to be presented) and/or individual reactions to signal and prompt opportunities for contextual interactive exchange among group members.

The CVA may increase engagement at both human-to-human and human-to-machine levels, including a goal of enhancing cognitive and/or emotional engagement. Interspersed content that includes a CVA may help to increase interest and engagement during both active and passive viewing and/or listening, initiate topical dialog and/or activities (substantially simultaneously) among members of a group, identify common interests and aspirations, and/or provide transitional context when topics within group content change or are about to change.

Within exemplary embodiments, during presentation of serial content, a machine-based awareness of the context(s) of the content may be derived. Serial content (that may also be referred to as "digital content") may comprise a continuous or "flowing" presentation of materials that may include audiovisual data, a video stream, a movie, an audio recording, a plurality of images, a multimedia presentation, a podcast, an audio book, output produced by an application (e.g., a game), an animation, and so on. Based on a derived contextual awareness, a "contextual" virtual agent (CVA) may be generated and interspersed during serial content delivery. A CVA may be generated as one or more of one or more displayed cartoon characters, displayed animals, displayed persons, displayed avatars, displayed icons, projected holograms, robots, animated toys, displayed text, voices, and sounds (including those that might typically be produced by an animal, toy or pet).

Users may interact with the delivery of serial content and/or CVA via one or more electronic interaction devices. Interactive devices may include one or more tablet devices, mobile phones, laptop computers, desktop computers, gaming devices, monitors, televisions, smart displays, speakers, smart speakers, projection devices, tactile electronic displays, virtual reality headsets, augmented reality headwear, holographic displays, and so on. Different devices may be used substantially simultaneously by different users. An individual user may even switch devices during an interactive session to, for example, transition from interacting at a stationary site (e.g., on a desktop computer) to being mobile (e.g., using a mobile phone).

The machine-based generation of a CVA may also utilize an awareness of the desires, likes, dislikes, interests, viewpoints, preferences, and/or other attributes of one of more of the group members (i.e., individual context) and/or an awareness of one or more user reactions to the content (i.e., reaction context). These contextual awarenesses may be applied to not only determine times to intersperse enhanced content but also to help (via the CVA and/or other presented materials) generate engaging topics within interspersed snippets. A CVA may introduce or expound upon topics based on, for example, knowledge of one or more interests or preferences of one or more users, one or more contexts of serial content, relationships between the content context(s) and individual or reaction context(s), one or more user reactions to the serial content, and/or one or more contexts of upcoming serial content.

In further exemplary embodiments, the interspersing of a CVA that alludes to the preferences and/or reactions of a user allows the plurality of users to attain heightened awareness of the contexts of individuals within the group including their interests, emotions, musings, fears, and so on. The mere fact that the delivery of serial content was interrupted due to a content context or reaction by at least one individual within the group signals a potential for contextual group interactions. Further introduction of a CVA that, for example, initiates and/or exhibits "nudges" (e.g., suggestions, ice-breakers, background materials resulting from web-based searches) regarding potential discussion topics based on the one or more content or reaction contexts greatly increases opportunities for group dialog and exchanges. The CVA may (optionally) directly point out machine-determined associations among the different contexts (e.g., likes or dislikes that are common among group members, a match between one or more individual interests and upcoming content).

Interspersed content may benefit members of a group who, for example, may have recently been introduced with little awareness of the contexts of other members of the group, as well as groups of individuals who are well known to each other but looking for deeper senses of connectedness. As described in greater detail in the Summary above, CVA may introduce or elaborate on one or more identified contexts with or without revealing the personal identity associated with contextual matches (i.e., within content, individual, reaction and/or ensuing contexts).

In further exemplary embodiments, another aspect of the systems and methods herein is determining when to pause the delivery of serial content in order to intersperse enhanced content including a CVA. In broad terms, sources (and computational resources) for determining when to pause may be described within three (3) categories:

1. Pausing serial content may arise upon receipt of a pause signal. A pause signal (generally binary) may arise as result of signalling, for example using a real or virtual push button controlled by one or more device users. Along similar lines, a pause may be signalled by a gesture, sound, or combination of actions performed by one or more device users. In addition, times to pause may be predetermined by encoding signalling data associated with (e.g., embedded within) the serial content. Additionally, pause times may depend on real-time assessments using one or more clocks. For example, the time since a previous interjection, the overall frequency of interjections and/or the timing of other user activities (e.g., going to school or bed) or other deadlines may be taken into consideration when determining whether to pause the delivery of serial content. Concurrent with the time a pause is enacted, if not already available (e.g., as a result of content pre-labelling) a machine-based determination of the context of serial content may be performed to help enact the "contextual" VA.

2. Alternatively or in addition, whether and/or when to pause serial content may be based on real-time determinations of the context(s) of the serial content. If the one or more contexts determined in real time from the content match one or more predetermined contexts, then delivery of the serial content may be paused and enhanced content interspersed. Predetermined contexts may, for example, be based on expressed preferences or interests of one or more participants within the group and/or pre-assembled (e.g., by writers, directors, or producers) lists of key contexts associated with the particular content. A variant of machine-based determining the context of serial content comprises performing such determinations on content not yet delivered to, or viewed by, device users (i.e., ensuing content). This results in a contextual awareness by the VA of interspersed content with upcoming (e.g., foreseeing the "future") user interactions related to the serial content.

3. The pausing of serial content may also be based on real-time determinations of the reaction(s) of one or more individuals within the group of users to the presentation of the content. Such reactions may be sensed by one or more cameras (e.g., facial expressions or gestures), one or more microphones (e.g., particular words or utterances), one or more processor input devices (e.g., touch screen, mouse) or even a disappearance of an ability to sense a user (e.g., leaving the vicinity of a device). User indications to pause the delivery of serial content may be overt (i.e., signalling known to both user(s) and machine(s)) or based on machine-based assessments of a user condition (e.g., bored, excited, upset).

Elaborating further within each of these categories, a pause indication may, for example, be determined from one or more signals of a current time, an elapsed time since the previous pause, a marker within the serial content, a frame number within the serial content, a time since the start of delivery of the serial content, an identified image within the serial content, a combination of identified images within the serial content, an identified sound within the serial content, a combination of identified sounds within the serial content, a combination of identified sounds and identified images within the serial content, an identified object within an image detected by one or more sensors, an identified movement of an object within a plurality of images detected by one or more sensors, a real or virtual button press detected by one or more sensors, and an identified sound detected by one or more sensors.

In additional exemplary embodiments, deriving signals from content data as one method of assessing if such signals meet one or more pause criteria may utilize processes of pre-labelling of potential pause times (e.g., locations/times within content) and/or context(s) within the serial content. A wide range of options are available to indicate such potential pause frames/times. The simplest consists of pre-planning (i.e., by a developer or supplier of the content) when each pause may occur within an audiovisual presentation and embedding digital indications directly within the serial content. Content data may also be pre-labelled to indicate context(s) and/or content(s) of each segment of serial content. Such labelling may then be compared to pre-establish criteria (e.g., the identification of specific objects, contexts, and/or sounds compared with established individual contexts and/or preferences) to determine when to pause and intersperse a CVA snippet.

At a practical level, a number of methods are available to store and link such labelling with serial content. For example, simple signaling (e.g., binary indications of pause locations) may be embedded in unused serial content (e.g., pixels representing the outer edges of images) or at locations that produce indiscernible effects (e.g., low-order bits of one or more image pixels or audio signals). More detailed labelling (e.g., contexts and objects) may be implemented using associated datasets that maintain so-called pointers to frames and/or other references within content data structures.

More sophisticated labeling may be enacted by following identified objects and/or sounds within associated datasets that describe (in a machine-understandable form) audiovisual content segments. Processes to label audiovisual data are well-known in the art and even available commercially on a fee-for-service basis. Such services are generally highly automated where human oversight and intervention ensure so-called "ground truths" within content. Examples of the large number (i.e., dozens) of tools that are currently available to aid in such content labelling include VoTT (Visual object Tagging Tool), MATLAB, CVAT (Computer Vision Annotation Tool), LabelMe, Doccano, Screenity, ImageJ, and so on.

Contexts within serial content context may also be determined in real time by natural language processing and/or image recognition processing. Various tools available to classify audio and video content are described in greater detail within the Background section above. Content, including content within individual segments, may be classified within a number categories, for example, based on intent (e.g., instructional, humorous), style of delivery (e.g., realistic versus make-believe), methods of delivery (audio only, black-and-white video), genre (drama, science fiction), and so on. Content may also be classified according to identified objects, locations, foreground versus background classifications, individuals, words, languages, ethnic contexts, speech patterns, audio volume, utterances, actions, music, sound effects, rate of scene changes, signage, and so on. Content may be further classified according to expected cognitive and emotional reactions of an individual including surprise, amusement, fear, horror, anger, rage, disgust, annoyed, contempt, sadness, joy, confusion, interest, boredom, calmness, anxiety, anticipation, envy, sexual desire, love, friendship, and so on.

Along similar lines, detected reactions by individuals during interactions with delivered content may be used to discern an "individual context". As described above, if such classified reactions substantially compare with one or more predetermined classifications of user reactions (e.g., preferences), the delivery of content may be paused and interspersed with a CVA snippet. Classified and/or identified reactions by a user may include surprise, amusement, fear, horror, anger, rage, disgust, annoyed, contempt, sadness, joy, confusion, interest, boredom, calmness, anxiety, anticipation, envy, sexual desire, love, friendship, and so on. Systems and method to classify such emotional and cognitive reactions by an individual are described in more detail in co-pending U.S. patent application Ser. No. 17/200,722, filed Mar. 12, 2021, the entire disclosure of which is expressly incorporated by reference herein.

Any or all of the various classified or identified contexts described above may be used as a basis to generate CVA responses. In other words, the following may individually or collectively be a basis for a CVA interaction snippet: 1) the context of serial content that has been displayed to group members; 2) ensuing (i.e., after a paused) context of content that has not yet been presented; 3) expected or typical human reactions (taking into account factors such as age, gender, social norms, traditions, and so on) to presented or ensuing content; 4) the preferences, viewpoints, interests and other contextual elements of one or more individuals involved with the group; 5) classified reactions to content delivery by one or more individuals involved with the group, and 6) associations (e.g., matches, disparities, first occurrences) among the various classified or identified contexts.

A CVA may, for example, acknowledge expected reactions, question the presence of specific feelings, act in a consoling manner, react in a manner similar to (or counterbalance) emotional or physical reactions, expound upon cognitive aspects of content, ask others within the group to comment on one or more aspects of identified content and/or individual reactions, provide background materials (e.g., from web-based searches) related to the content or its production (e.g., actors, directors), provide storytelling related to identified or expected feelings, provide additional (e.g., technical) information related to the content, ask to guess about what future content might reveal, point out that most members of the group (perhaps indicating exceptions) have one or more common interests, indicate a topics or context that has not previously been raised, and so on. Additionally, the CVA may initiate interactive games, online or offline ventures, teaching presentations, communications experiences, or other forms of contextually relevant and/or meaningful software applications and/or activities among users, or between the CVA and one or more users.

Contextual approaches may also be used to determine when to end an interspersed CVA-based snippet. In other words, a return to the presentation of serial content may, for example, be indicated by a signal (e.g., virtual pushbutton) from one or more group members, reactions of all or a subset of group members, elapsed time of an interjection, completion of a context-based CVA script, and so on. Another signal that a return to the presentation of serial content is appropriate or timely includes when there is no further interaction or input (i.e., determined from device sensors) from group participants.

In further exemplary embodiments, levels of programming required to enact the CVA may vary widely during deployment, from the use of pre-established "if-then" conditions and pre-scripted interaction sequences up to outputs generated by sophisticated inference machines. At a basic level, a CVA may react to classified reactions via pre-established CVA responses and/or actions. Known entities such as current time, user preferences and/or classified context(s) may be inserted into such scripted sequences. Scripts may take the form of assertive statements (e.g., "You smiled!") or questions (e.g., "Are you scared?") directed at the group member(s) involved in the identified classification(s). This may not only "nudge" individual group member(s) to perhaps engage others about their reaction(s), but CVA action(s) may allow others within the group (e.g., parents, friends, grandparents, guardians) to become aware of such reactions, particularly if they are unable to directly see or hear the remote individual(s) during the shared consumption of serial content. Simply pointing out such individual contexts to the group may enhance engagement.

As further exemplary embodiments of CVA actions, a CVA may point out or describe any of the classified content contexts (and/or any other known entities). Once again, this may be expressed in the form of scripted statements ("There is a cat!") or questions ("Did you see the car?"). Spatial and/or temporal relations among various classified contexts may be incorporated in such dialog (e.g., "Did you see the cat next to the car?"). Application of image and/or audio recognition to classify and/or identify specific objects or classes of objects or sounds may further enhance individual and/or group engagement. For example, a statement by the CVA identifying the specific color and/or manufacturer of an identified automobile within the serial content may trigger engagement among car enthusiasts and others. Along similar lines, asking about or confirming the identity of particular actresses or actors within a movie may promote dialog among movie-goers, or the identity of a sound from a bird may enhance exchanges among bird watchers.

Within further exemplary embodiments, a CVA may use both non-public information provided by one or more users (e.g., names and birthdays of members within the group) and/or public domain (i.e., web-based) search strategies to enhance cognitive aspects of engagement. As an example, the identification of a dinosaur context within serial content may trigger web-based searches to reveal that dinosaurs are reptiles that existed approximately 200 million years ago. A variety of search tools (e.g., Google) and information sources (e.g., Wikipedia) are available to support such content and/or cognitive enhancements. Results of such contextual searches and/or associations may be displayed or presented on group devices and/or articulated by a CVA.

As illustrated particularly within descriptions associated with FIGS. 4 and 6 below, individual contexts (e.g., preferences, aspirations, likes, dislikes) may be compared with content and/or ensuing contexts to form a basis for CVA responses or actions. Individual contexts may also be compared with other individual and/or content (i.e., past and/or future) contexts as part of a process to determine relations among all known contexts. As an example, the appearance of a dog within content may trigger a content pause and result (i.e., upon searching individual contexts) in a CVA to communicate "Jane and John both like dogs". The pointing out of common interests (preferences, or even dislikes) within contexts during shared consumption of content may be particularly engaging among group members.

Using more sophisticated programming methods, the one or more processors involved in CVA generation may (optionally) be instantiated with an artificial intelligence. The artificial intelligence may, in turn, include a personality that is (or becomes) familiar to the one or more users. A single artificial intelligence personality (AIP) may be shared among all participants within a group, AIP personalities may differ, or AIP characteristics may be adapted to increase acceptance by the individual users within a group. As examples of the latter, appearance (e.g., cartoonish, realistic) and/or voice (e.g., gender, dialect) may be adjusted based on individual user preferences. CVA size may be adjusted to conveniently fit on the screen of a particular display device. Aspects of such shared AIPs are described more fully in U.S. Pat. No. 10,762,414, filed Apr. 19, 2019, U.S. Pat. No. 10,915,814, filed Jun. 15, 2020, and U.S. Pat. No. 10,963, 816, filed Oct. 23, 2020, the entire disclosures of which are expressly incorporated by reference herein.

As one scenario that exemplifies various triggers for pausing delivery of serial content and interspersing a CVA, consider a young child and one or more remote grandparents interacting during a shared viewing experience of a cartoon animation involving a dinosaur. Based on a brief time (i.e., derived from a real-time clock) since starting presentation of the serial content, the CVA interrupts to ensure everyone knows who is sharing the viewing experience by having each participant introduce themselves and possibly state how they are feeling. Upon hearing from everyone and restarting delivery of the animation, machine-based classifications indicate that all participants appear generally relaxed and attentive. However, when the dinosaur suddenly stands up and roars loudly, the young child screams. This sensed (i.e., audio) reaction context, results in a pause in content delivery and an interspersed CVA to ask "Are you OK?" (i.e., directed at the young child but viewed/heard by all). The young child reveals (to the CVA and grandparents) feelings of being scared and/or bullied.

At this point in the scenario, the grandparents may explain to the child that dinosaurs are normally quite large and can make such roaring sounds. The CVA may add search-based facts about the normal sizes and appearances of different dinosaurs. Upon detecting no further interchange, the delivery of serial content continues until a scene that includes a hilarious introduction of animated toy "superhero" characters. The animation context and/or indications of laughter sensed by one or more participants triggers an interspersed CVA to ask "What's so funny?". After allowing all participants to describe aspects that appear funny, the sound track of the animation switches to dance music. Knowing that one of the predetermined "likes" by the young child is to dance, the CVA interrupts delivery of serial content to suggest "Let's dance!".

Detecting dance activities by the young child, an intent engine driving the CVA may temporarily switch content to a dance video (i.e., a separate software application) providing an extended opportunity for dancing activities and for the grandparents to praise the young child's dancing abilities. The one or more grandparents may then signal (e.g., via a virtual pushbutton) a return to the original dinosaur animation. Knowing that the pre-specified age of the young child is at a level of just learning how to count, an interjection by the CVA may ask "How many superheroes are there?". Similar interspersed CVA actions and activities may continue indefinitely; however, at this point, the time may be approaching a pre-specified bedtime for the young child, resulting in a suggestion by the CVA to end the session.

Turning to the drawings, FIG. 1A illustrates another scenario in which three (3) individuals 10a, 10b, 10c simultaneously view serial content (for illustration purposes, shown as successive images within a traditional-appearing film strip 14). In this example, serial content 14 includes a cartoon animation involving a unicorn moving across the screen. Content may be generated via one or more (local or remote) processors 13a, 13b, 13c acting as content generators and/or servers, and delivered via one or more forms of telecommunications 15. Content may be viewed and/or heard by three (3) individuals 10a, 10b, 10c on their respective interaction devices 11a, 11b, 11c. Content 14 is delivered substantially simultaneously to all devices where a (substantially simultaneous) unicorn-based scene 12a, 12b is visible on a mobile phone 11a and tablet device placed on a desk, while not visible (but still present) on a second tablet device 11c.

Figure 1B:
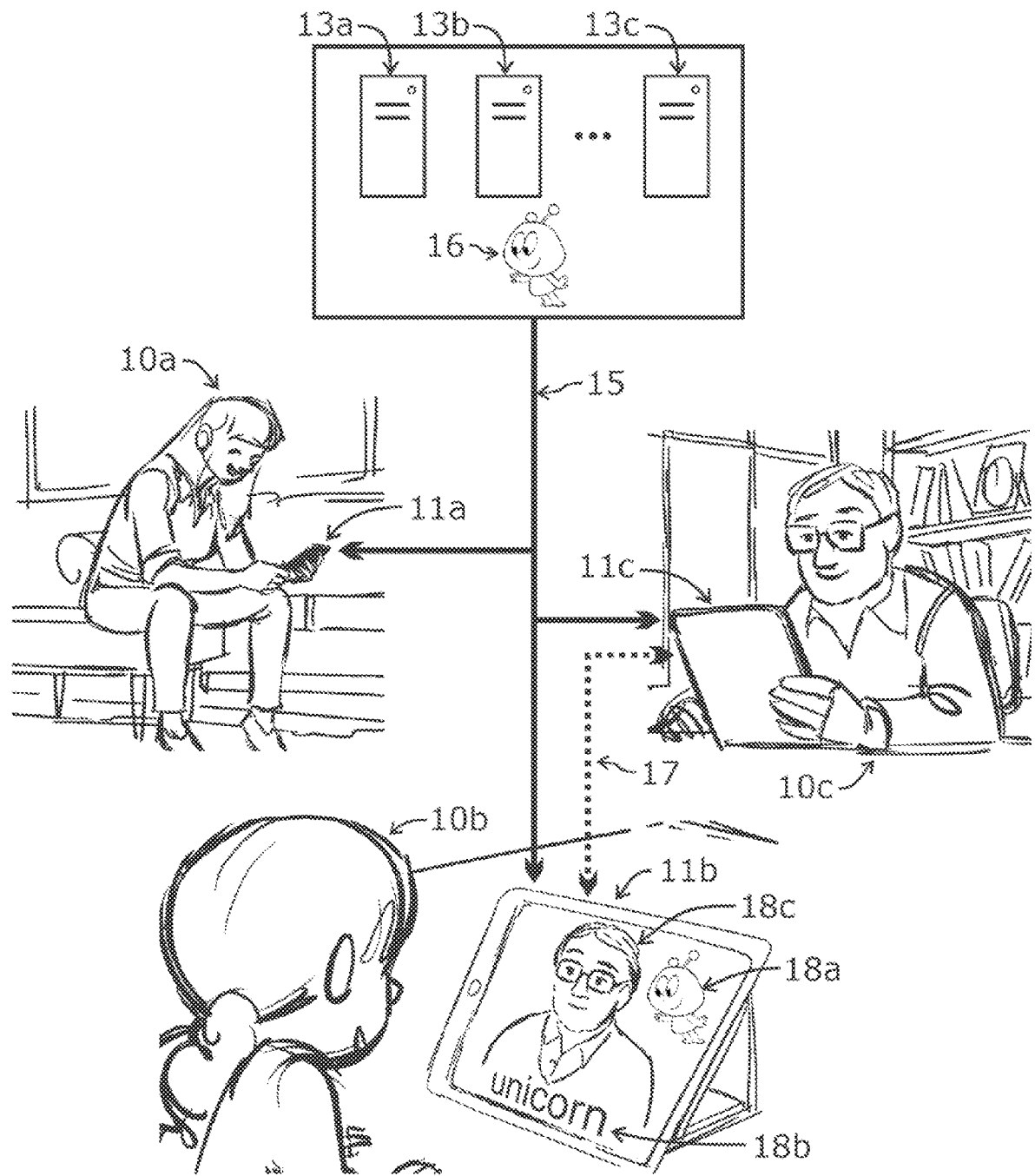
FIG. 1B follows on from the scenario illustrated in FIG. 1A in which, as a result of a match between content context (i.e., the display of a unicorn) and an individual context (i.e., a young girl's liking of such toys), the delivery of content is paused and replaced by an audiovisual snippet that include a virtual agent reacting to the identified context.

FIG. 1B follows on from the scenario illustrated in FIG. 1A in which, as a result of the context of the content (i.e., the display of a unicorn), the delivery of the serial content 15 to all devices 11a, 11b, 11c is paused and replaced by audio-visual scenes that include a generated virtual agent 16 reacting to the content context. Along with displaying a CVA 18A, the CVA may, for example, enunciate the word "unicorn" to both identify what was just viewed and help reinforce word pronunciation, particularly for the young girl 10b. The CVA 18a may interject a brief story about unicorns. Additionally, as a further example of the contextual intervention, the word "unicorn" 18b is spelled out on display devices 11a, 11b, 11c.

Interjections may differ somewhat on the various interaction devices 11a, 11b, 11c. This may arise as a result of device limitations (e.g., the relatively smaller display screen of a mobile device 11a) and/or strategies to maintain engagement by different users 10a, 10b, 10c. As an example of the latter, a telecommunications link 17 is established between the young girl 10b and one of the simultaneous viewers 10c as a pipeline for video chat, further enhancing educational and/or entertainment experiences, particularly for the young girl 10b. Within the scene illustrated in FIG. 1B, a video chat image of an adult 18c can be seen on the display device 11b of the young girl 10b while the corresponding image of the young girl during video chat on the interactive device 11c of the simultaneous viewer 10c is not visible in FIG. 1B (but nonetheless present).

Figure 2:
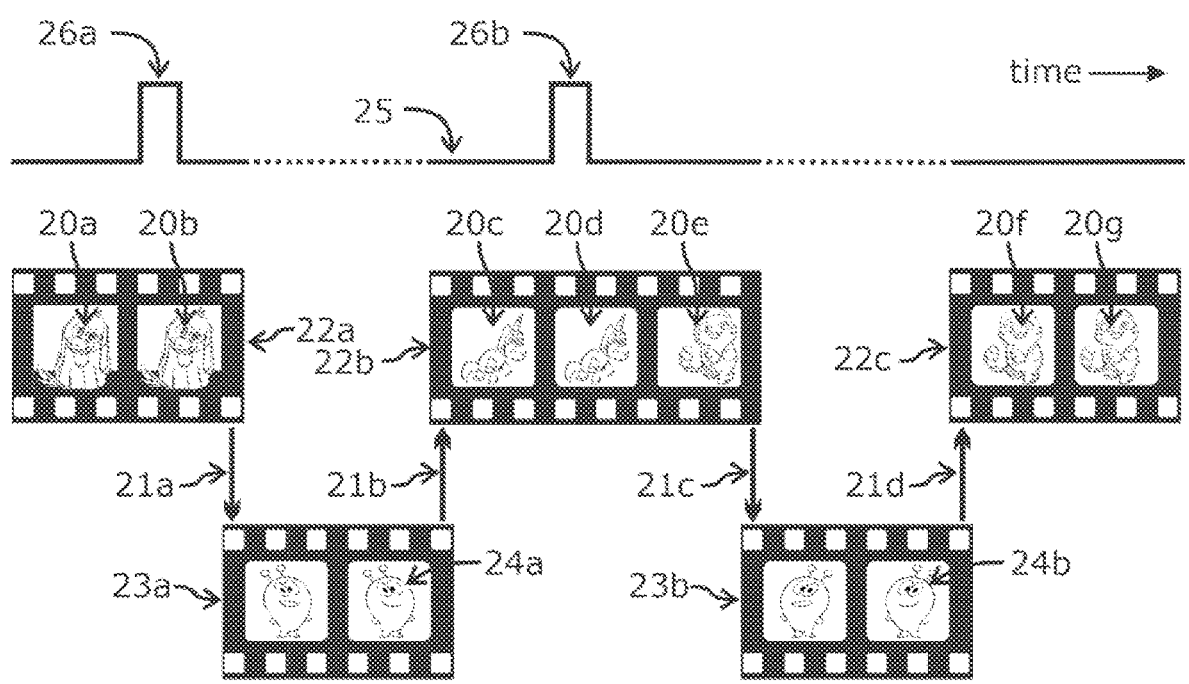
FIG. 2 illustrates a timeline of delivery of serial content in which segments by a contextual virtual agent are interspersed based on the context of the audiovisual content and viewer reactions.

FIG. 2 illustrates an exemplary timeline of delivering serial content in which CVA snippets are interspersed based on the context of audiovisual content and/or interaction reactions. Serial content is depicted as a series of frames 20a, 20b, 20c, 20d, 20e, 20f, 20g within traditional-appearing film strips. Interspersed within the serial content are audiovisual segments or snippets 23a, 23b that include a CVA 24a, 24b. FIG. 2 also depicts a digital signal 25 that labels the serial content 22a, 22b, 22g to indicate when context is about to change (i.e., during the next or upcoming frame).

Stepping though the timeline in FIG. 2, the digital signalling 26a during the second frame 20b indicates that serial content is about to change from displaying a dog 20a, 20b to displaying a unicorn 22b. As a consequence, an audiovisual segment 23a that includes a CVA 24a is inserted 21a into the interaction content. Once presentation of this snippet 23a is complete 21b, delivery returns to the next segment of serial content 22b that includes unicorn-based content 20c, 20d.

Within this next audiovisual segment 22b, a second digital indication 26b of a pending change in content from a unicorn 20d to a cat 20e is available. In this scenario, this signal 26b is not used to introduce a new CVA segment, for example, because it occurs too soon (for enjoyable viewing) after the previous CVA snippet 23a.

Figure 7:
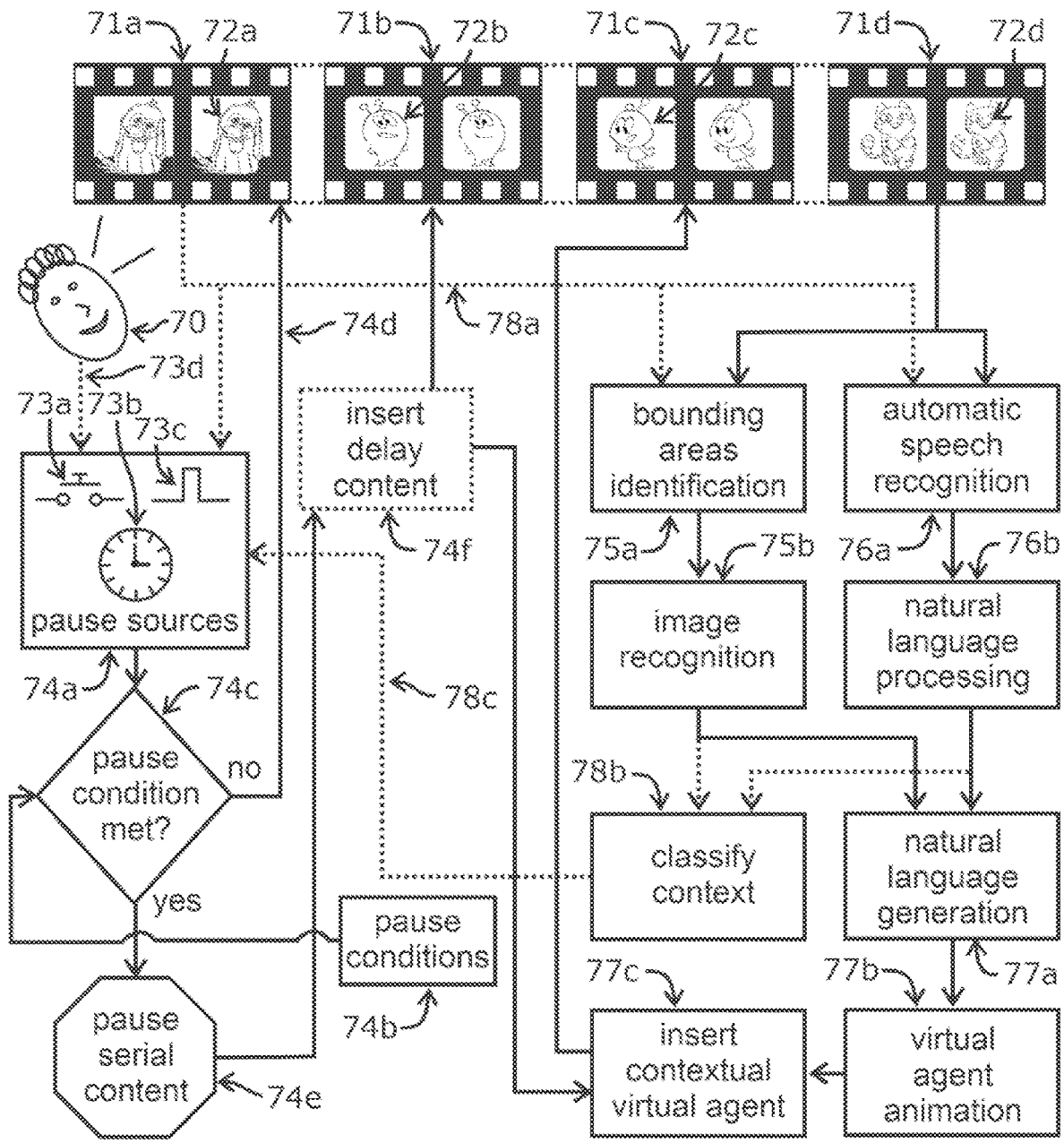
FIG. 7 is a flowchart outlining steps to intersperse a virtual agent that initiates interactions based on one or more contexts of content not yet experienced (e.g., not yet seen or heard) by users.

However, serial content 22b changes to the display of a favorite cat 20e. The observed presence of this favorite object (e.g., previously specified within individual contexts of a user) may be recognized within analyses of the context of the serial content as depicted in FIG. 4 and/or by classification of the reactions of the content viewer, as depicted in FIG. 7. Either or both of these conditions causes a transition 21c to a snippet 23b containing a CVA 24b. Once presentation of the snippet 23b is complete, delivery transitions back 21d to provide a final segment 22c of serial content with further scenes showing the cat 20f, 20g.

Figure 3:
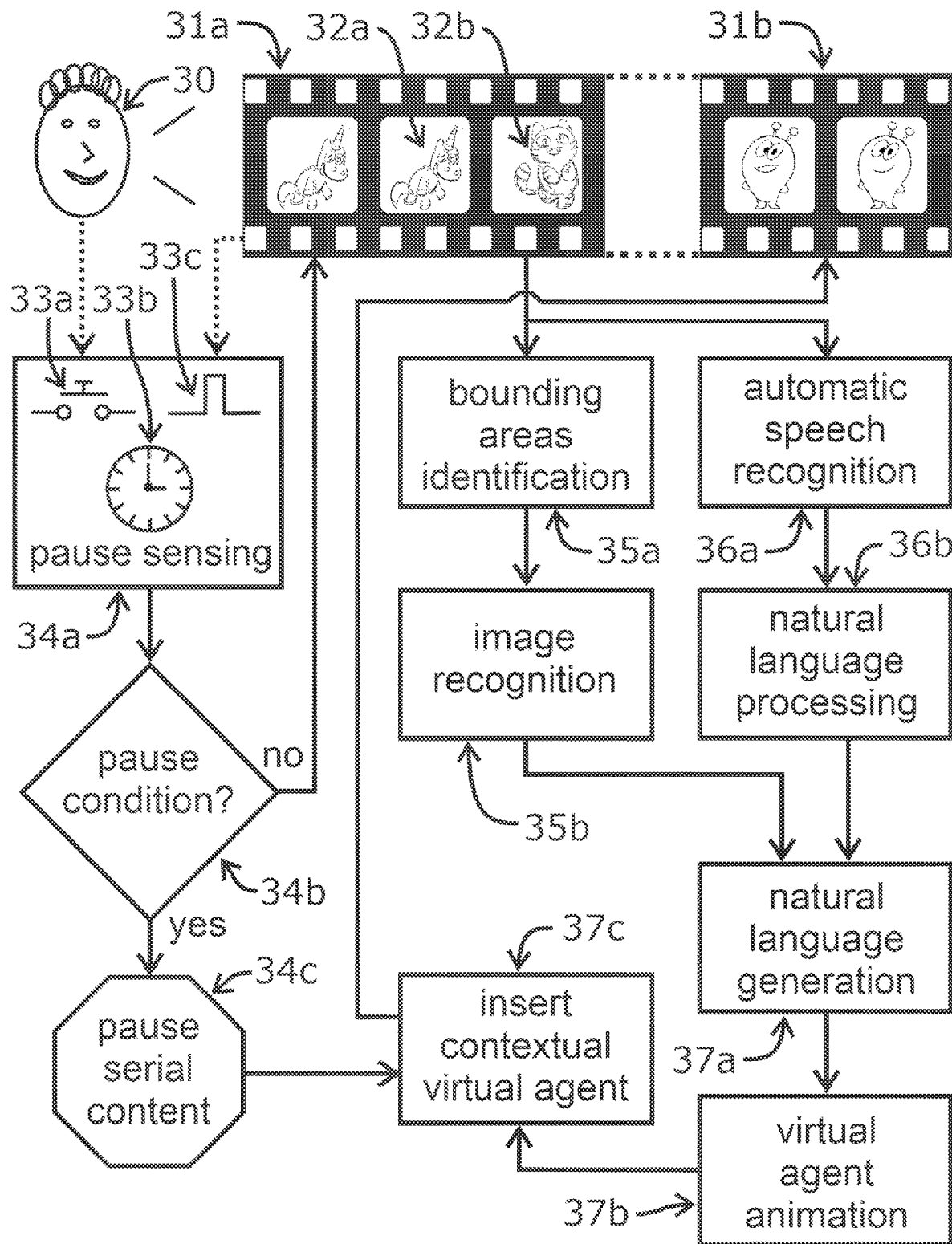
FIG. 3 is a flowchart outlining steps to intersperse a contextual virtual agent within delivery of serial content when indications of times to intersperse the virtual agent are determined from signals by a user, timer, and/or labeling encoded in conjunction with the content.

FIG. 3 illustrates a flowchart outlining steps to intersperse a snippet that includes a CVA during delivery of serial content 31a when indications (i.e., one or more signals) of times to intersperse the CVA are directly sensed 34a. As examples, a user 30 (or any other human) may indicate a desire to pause, for example, using a real or virtual push button 33a. Alternatively or in addition, indications of context (i.e., labelled content) and/or a pause signal may be encoded in datasets associated with the serial content and subsequently sensed 33c. For example, serial content may have been pre-labelled to indicate a transition in scenes from a unicorn 32a to a cat 32b. Indications to pause may also depend on time 33b including, for example, an elapsed time since a previous pause and snippet interjection.

When a pause condition is present 34b, the delivery of serial content 31a is paused 34c, and replaced by an interjection that includes a CVA 31b. Content of the interjected snippet may, in part, be generated based on identifying (i.e., classifying) serial content coincident with the pause. Processing may include identifying bounding areas for objects 35a and subsequent identification of those objects 35b, and/or processing audio components of the serial content including automatic speech recognition 36a and subsequent natural language processing 36b that may discern content and/or intent (i.e., context). The results of video 35a, 35b and/or audio 36a, 36b processing may then be applied as inputs to natural language generation 37a and animation processing 37b to form a CVA interjected 37c into the content data stream 31b.

Figure 4:
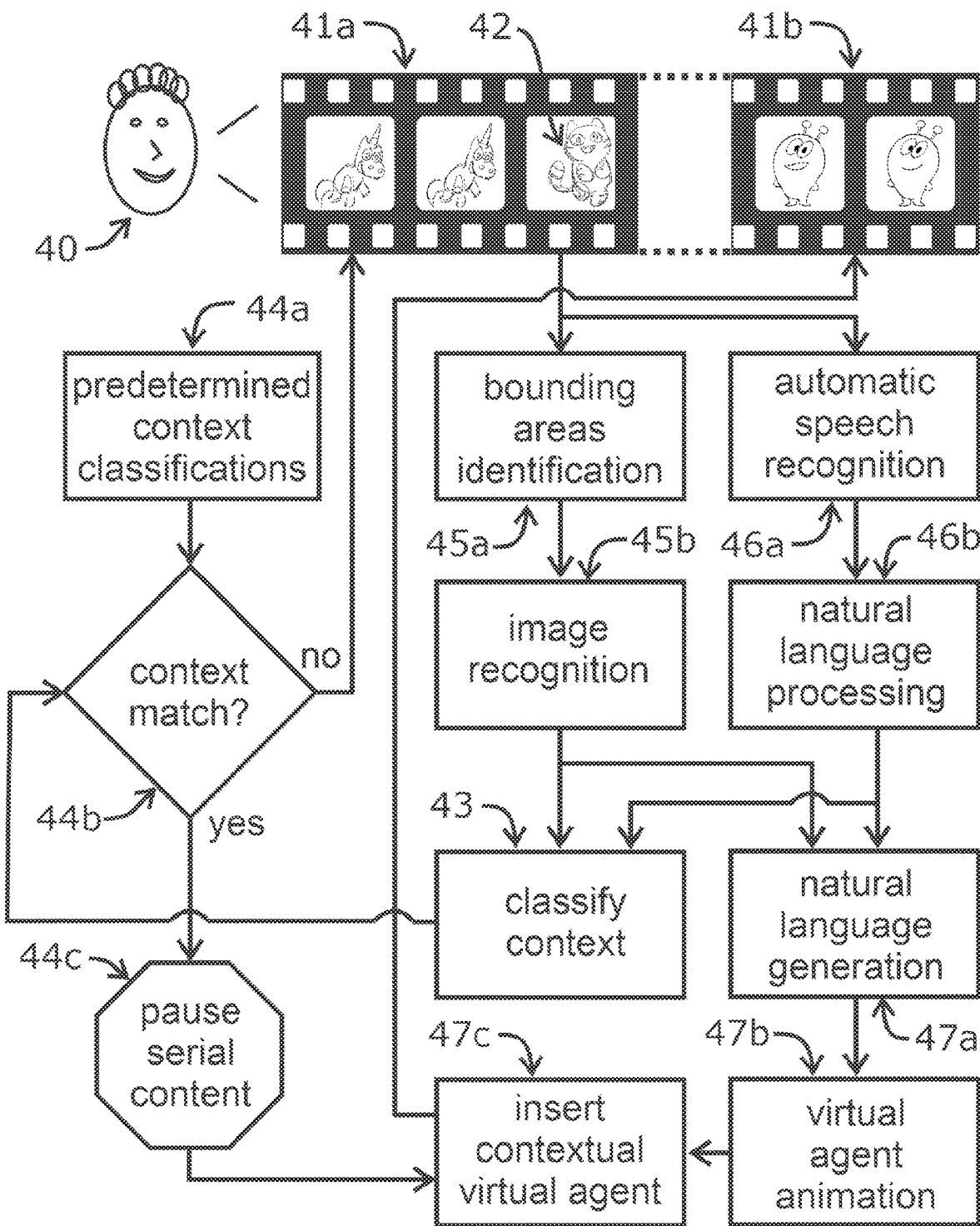
FIG. 4 is a flowchart outlining steps to intersperse a contextual virtual agent within the delivery of serial content when times to intersperse the virtual agent are ascertained from real-time determinations of context(s) of the content.

Along similar lines, FIG. 4 shows a flowchart illustrating steps to intersperse a CVA within the delivery of serial content 41a when indications of times to intersperse the CVA are determined from the context(s) of the serial content. In this case, context is determined based on processing video components of the serial content including identifying bounding areas for objects 45a and subsequent identification of those objects 45b, and/or processing audio components of the content including automatic speech recognition 46a and subsequent natural language processing 46b. Video and/or audio results may be applied as inputs to a context classifier 43.

The classified context 43 of the serial content 41a may then be compared with a dataset of predetermined contextual classifications 44a to ascertain if there is a match 44b of the one or more contexts. For example, one context within this dataset 44a might include the appearance (perhaps of particular interest to a specific individual 40) within the serial content 41a of a cat 42, as shown in FIG. 4. If a match is not present, then delivery of serial content 41a continues uninterrupted. If a match is present, then delivery of serial content 41a is paused at 44c, and a CVA 47c is generated and interspersed within the content data stream 41b. The same or similar video 45a, 45b and/or audio 46a, 46b data used during classification 43, may be applied to a natural language processor 47a and animation generator 47b to be used during generation of the CVA 47c.

Figure 5:
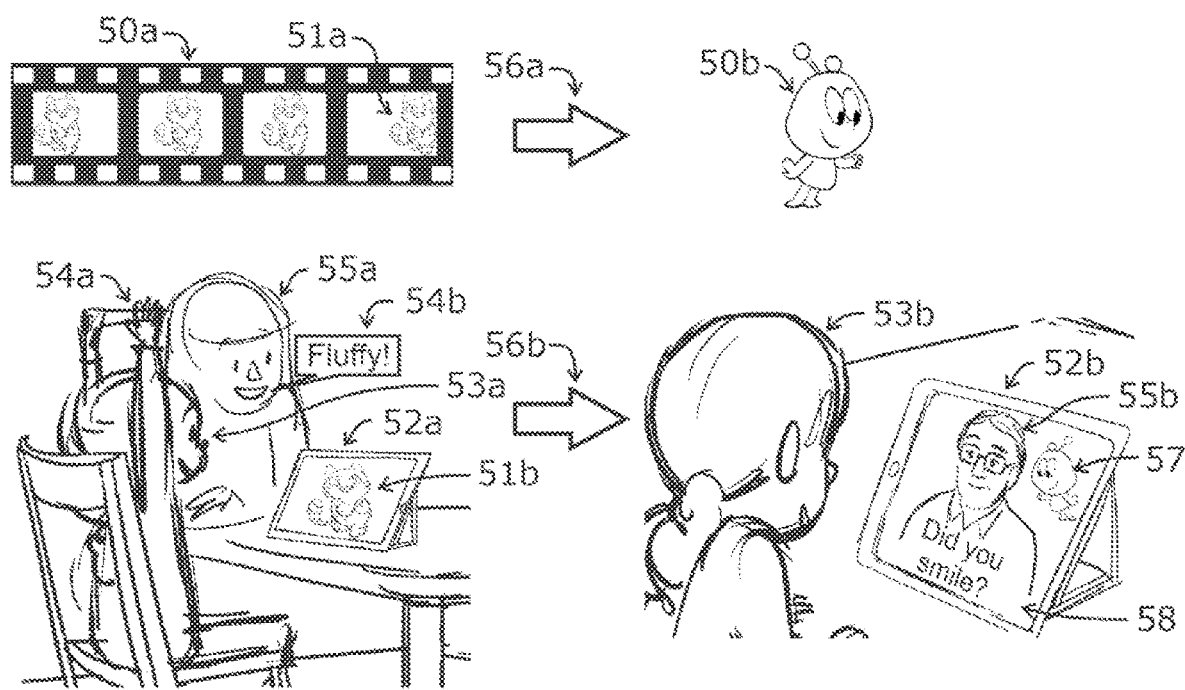
FIG. 5 shows scenes from a scenario in which one or more user reactions (i.e., by a young girl and/or nearby adult) are used to determine when to interrupt the delivery of content to intersperse a content snippet that includes a contextual virtual agent.

FIG. 5 shows scenes from a scenario in which one or more contextual user reactions (i.e., by a young girl 53a and/or nearby adult 55a) are used to determine when to interrupt the delivery of serial content 50a by interspersing content that includes a CVA. In this scenario, serial content 50a includes images (and sounds) of a cat 51a broadcast to an interactive device 52a directed toward the young girl 53a and to one or more other devices (not shown). The young girl 53a reacts to the display of the cat 51b with a smile and raising both of her hands 54a. In addition, the nearby adult 55a reacts with a smile and calls out a name for the cat (i.e., "Fluffy") 54b. Either or both of these sensed reactions may be detected and used as one or more signals to pause delivery of serial content.

Upon pausing, content transitions (indicated by right-pointing arrows 56a, 56b) to processes that include generating a CVA 50b and showing the CVA 57 on the display device of the young girl 52b (and the one or more devices of other users, not shown). Similar to the scenario depicted in FIG. 1B, the transitioned content includes a video chat capability by the young girl 53b with another user 55b. Another contextual insertion (designed to promote interaction) is the display of a (rhetorical) question "Did you smile?" 58 on the display 52b of the young girl 53b. In this case, the contextual basis for actions by the CVA includes not only context of the delivered serial content, but also detected and classified reactions by the one or more users 53a.

Figure 6:
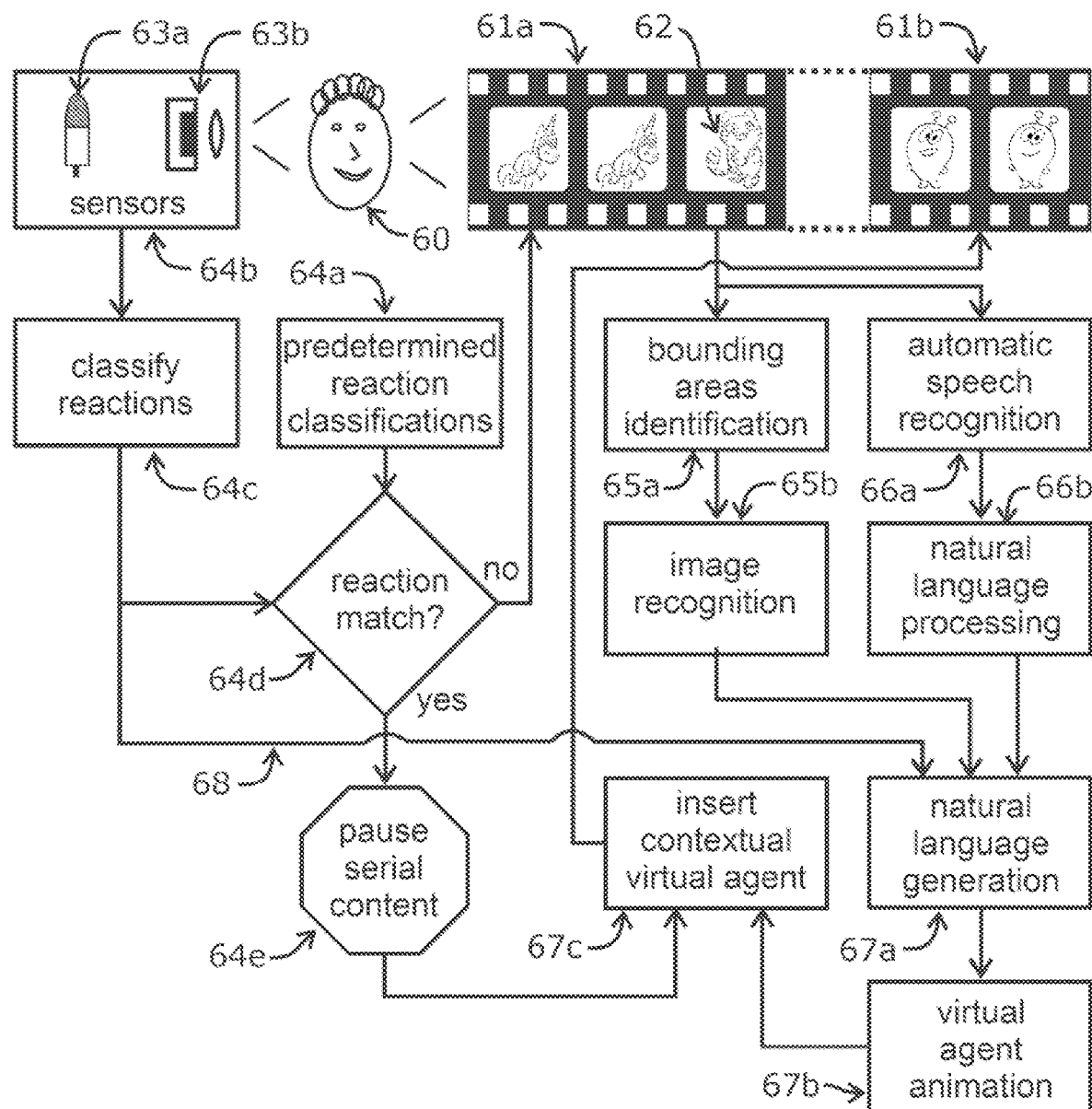
FIG. 6 is a flowchart outlining steps to intersperse a contextual virtual agent during delivery of content when times to intersperse a virtual agent snippet are determined based on user reactions.

FIG. 6 is a flowchart outlining steps to pause and subsequently intersperse content based on one or more reactions of a user 60. As an example, the user 60 may respond to the appearance of a cat 62 shown within the serial content 61a. Reactions by the individual 60 are monitored by one or more sensors 64b. User 60 movements may be monitored by a camera 63b and speech (or other sounds) may be detected by a microphone 63a. The user may also react using a variety of other processor inputs (not shown) including screen tap, keyboard, mouse, joystick, remote control, and so on.

User reactions may be classified 64c and compared 64d with one or more classifications of predetermined user reactions 64a. If a match is not present, then delivery of serial content 61a continues uninterrupted. If a match is present, then delivery of serial content 61a is paused 64e, and a CVA 67c is generated and interspersed within the content data stream 61b. The CVA may be generated using the same general steps as outlined in FIGS. 3 and 4 where video data are processed by identifying bounding areas 65a followed by image recognition 65b, and audio data are processed by automatic speech recognition 66a followed by natural language processing 66b. Video and audio analyses may then be used during natural language generation 67a and virtual agent animation 67b to form the CVA. Additionally, natural language generation 67a and virtual agent animation 67b processes may take advantage of knowing reactions (via classification) and any associations (e.g., common or differing reactions) of the one or more users 68 when formulating CVA actions and/or other interspersed content.

FIG. 7 is a flowchart outlining steps to intersperse a CVA 72c that may initiate enhanced interactions based on one or more contexts of "future" serial content. This apparent ability of a CVA to know the future may be implemented by classifying the context of serial content 71d before presenting that content to the one or more users 70. This enables user experiences in which, for example, a user 70 may be alerted to upcoming content that may be of particular interest.

In FIG. 7, potential triggers to pause serial content in order to intersperse an interaction may arise using any of the three (3) general methods depicted in FIG. 3 (i.e., pause signals), FIG. 4 (i.e., presented serial content), and/or FIG. 6 (i.e., user reactions). In FIG. 7, pathways to enact these trigger sources are generally depicted using dashed lines (e.g., 73d, 78a, 78c), attempting to distinguish those pathways from shared data processing pathways used to enact snippets (e.g., 71c) that may include generating the CVA (e.g., 72c) with apparent knowledge of future content.

Triggers that may pause the presentation of serial content 71a include real or virtual pushbuttons 73a (e.g., triggered by any user), timed events 73b, and/or signals 73c that may be embedded in content and/or extracted from content-associated (e.g., labelled) datasets. Alternatively or in addition, the context of presented content 71a may be processed 78a for image 75a, 75b and/or audio 76a, 76b classifications 78b for inclusion 78c as potential sources for pause signals (e.g., a pause resulting from recognizing a favorite dog 72a). In further embodiments, user reactions 73d may be classified and compared with predetermined reaction classifications 74b to trigger the pausing of serial content and interspersing one or more snippets 71b, 71c.

The presence of a pause condition may be acquired from the various pause sources 74a just described and compared with pre-established pause conditions 74b (e.g., one or more user likes or preferences). If no pause condition is met 74c, then the presenting of serial content 71a simply continues 74d. If a pause condition is met, presentation (e.g., display and/or audio broadcast) of the serial content is paused 74e. At this point, processing for context of the serial content 71d may continue (covertly). This processing may involve bounding areas identification 75a and image recognition 75b of video data, and/or automatic speech recognition 76a and natural language processing 76b of audio data. Results may be used as inputs to natural language generation 77a and animation 77b routines to produce a contextual (seeing into the future) virtual agent. Processing may occur over a time course equivalent to normally broadcasting the data stream, or over an accelerated time course if transmission and/or computing resources are sufficient to handle such analyses.

During this (generally brief) processing time, no CVA with knowledge of future content may be available or exhibited to a user 70. As an alternative to the display of a blank screen and/or lack of any audio, content may (optionally, indicated by a dashed outline rectangle 74f) be inserted as a transition or segue from the presented serial content 71a to the target content 71c that may include a CVA 72c having knowledge of "future" context(s). This optional transitional content 71b may, for example, include a general introductory snippet and/or interactions by a virtual agent 72b not yet aware of future content.

Once the CVA armed with knowledge of the future 72c is available 77c, a resultant snippet 71c that includes this CVA 72c may be inserted into the data stream for viewing and/or listening by the user 70 (and other users, not shown). Upon completion of this snippet 71c, presentation of the paused serial data stream 71d may resume. These data may, for example, reveal context within enactments by the CVA 72c apparently able to see into the future (e.g., alerting a user to a favorite cat identified in the upcoming audiovisual sequence 72d).

Figure 8:
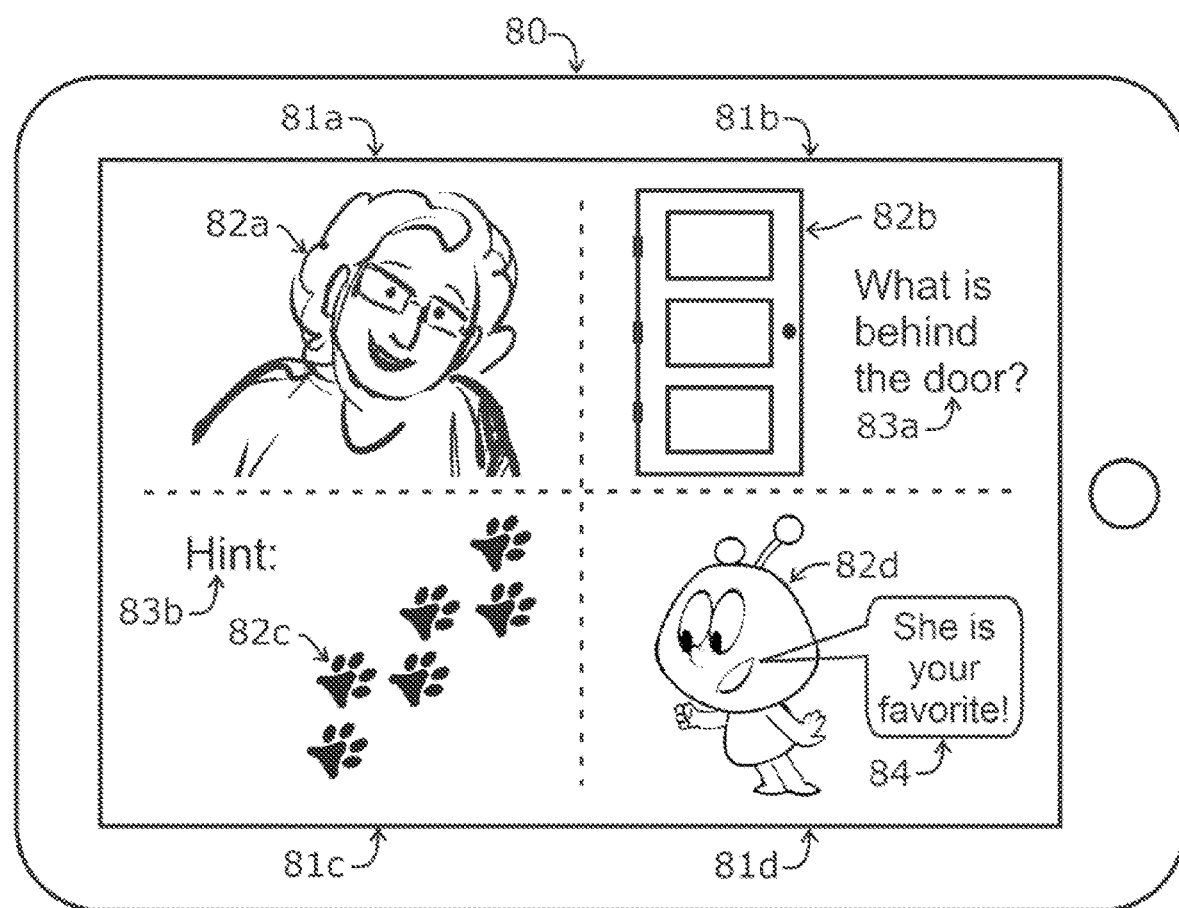
FIG. 8 demonstrates the display of exemplary interspersed contextual components including a virtual agent, video chat, an engaging guessing game, and a hint (as a part of the game) about the context of "future" content (i.e., machine classified, but not yet revealed to the user).

FIG. 8 demonstrates on a tablet device 80, exemplary interaction components including video chat 82a, a CVA 82d, and hints 82c about upcoming serial content (i.e., machine classified, but not yet displayed). Within this exemplary interaction, the screen 80 is divided into four (4) simultaneously functional areas 81a, 81b, 81c, 81d. The upper right region 81b is designed to engage users by asking the question 83a "What is behind the door?" (e.g., referencing an object or action within upcoming serial content). Within the lower left region 81c a set of paw prints 82c is provided as a hint 83b regarding what has not yet been seen. The lower right region 81d shows a CVA 82d that adds a further hint via an audio exchange "She is your favorite!". At the same time, the upper left region 81a shows an area for simultaneous video chat with a remote user 82a providing further user encouragement.

In this scenario designed to enhance engagement, opening the door 82b (e.g., by tapping the tablet screen in the region of the door's handle) reveals images of a cat (not shown). As outlined within the scenario in FIG. 7, feline classifications may be pre-established as one condition (i.e., an individual context) for pausing the delivery of content. The upcoming appearance of a cat within serial content causes a pause in content delivery and interjection of the transitional and/or enhanced materials.

The articulating "She is your favorite!" 84 by the CVA 82d may be included as one of any number of "conditional actions" previously setup by a device user. Further aspects of setting up such conditional actions (i.e., actions that are performed by a virtual agent at some time in the future when one or more pre-established conditions are met) are described in greater detail within U.S. Pat. No. 10,962,816, filed Oct. 27, 2020, the entire disclosure of which is expressly incorporated by reference herein. In the conditional action example demonstrated in FIG. 8, the classification of a cat within serial content is the "condition" and articulating by a virtual agent, specific feelings toward the cat (i.e., "She is your favorite!") is the "action".

Setting up such conditional actions may allow individuals (e.g., friends, parents, colleagues) to significantly enhance the apparent knowledge and/or "realism" of a virtual agent. By pre-establishing any number conditional actions (i.e., anticipating situations that may be encountered) individuals may effectively "time-shift" their influence and/or activities (i.e., to be performed at some time in the future by the virtual agent as situations are encountered).

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to encourage human engagement, comprising:
providing a plurality of electronic devices, each electronic device comprising a processor, an output device operatively coupled to the processor, and a sensor operatively coupled to the processor for monitoring reactions of a user of the electronic device;
delivering, substantially simultaneously on output devices of all of the electronic devices, serial content for users of all of the electronic devices to view as a group;
detecting, by one or more of one or more processors of the electronic devices and one or more sensors of the electronic devices, a pause indication related to emotional or facial reactions of one or more of the users to the serial content;
pausing, substantially simultaneously on all of the output devices, the delivering of the serial content based on the pause indication;
determining, by the one or more processors, one or more serial content contexts related to the serial content coincident with the pausing of the delivering of the serial content; and
generating a virtual agent as a displayed character with voice that is presented substantially simultaneously on all of the output devices using the one or more processors, the virtual agent initiating an interaction including a conversation between the virtual agent and one or more of the users based on the one or more serial content contexts.

2. The method of claim 1, wherein each of the electronic devices comprises one or more of one or more tablet devices, mobile phones, laptop computers, desktop computers, gaming devices, monitors, televisions, smart displays, speakers, smart speakers, projection devices, tactile electronic displays, virtual reality headsets, augmented reality headwear, and holographic displays.

3. The method of claim 1, wherein the serial content comprises one or more of audiovisual data, a video stream, a movie, an audio recording, a plurality of images, a multimedia presentation, a podcast, an audio book, output produced by an application, and an animation.

4. The method of claim 1, wherein the serial content context is determined by one or more of acquiring context labelling of one or more segments of the serial content, classifying the serial content by natural language processing, and classifying the serial content by image recognition processing.

5. The method of claim 1, wherein the virtual agent is generated as one or more of one or more displayed cartoon characters, displayed animals, displayed persons, displayed avatars, displayed icons, projected holograms, robots, and animated toys delivered simultaneously on all of the output devices.

6. The method of claim 1, wherein the processor is instantiated with an artificial intelligence.

7. The method of claim 1, further comprising, upon detecting the pause indication, determining, by the one or more processors, one or more ensuing serial content contexts after pausing the displaying of the serial content.

8. The method of claim 1, further comprising:
acquiring, from the interaction with the one or more humans, interaction data from the sensor of at least one of the electronic devices;
classifying from the interaction data, using one or more processors, one or more content reactions by the one or more humans; and
initiating, by the virtual agent generated on all of the output devices using the one or more processors, one or more additional interactions with the one or more humans based on the one or more content reactions.

9. The method of claim 1, wherein the users comprise a child and one or more adults and wherein the virtual agent enhances interactive engagement between the child and the one or more adults.

10. The method of claim 1, wherein the interaction by the virtual agent prompts an exchange between the users related to the serial content.

11. The method of claim 1, wherein the one or more sensors comprise one or more cameras that are used to identify facial expressions or gestures of one or more of the users to identify the reactions.

12. A method to encourage human engagement, comprising:
providing a plurality of electronic devices, each electronic device comprising a processor, and an output device operatively coupled to the processor;
delivering, substantially simultaneously on output devices of all of the electronic devices, serial content for users of all of the electronic devices to view as a group;
determining, by the one or more processors, one or more serial content contexts, wherein the one or more serial content contexts comprise serial content within the serial content that generates one or more human feelings or reactions;

determining, by one or more processors, that the one or more serial content contexts match one or more predetermined contexts;

pausing, substantially simultaneously on all of the output devices, the delivering of the serial content; and generating a virtual agent as a displayed character with voice that is presented substantially simultaneously on all of the output devices using the one or more processors, the virtual agent initiating an interaction including a conversation between the virtual agent and one or more of the users based on the one or more serial content contexts.

13. The method of claim 12, wherein each of the electronic devices comprises one or more of one or more tablet devices, mobile phones, laptop computers, desktop computers, gaming devices, monitors, televisions, smart displays, speakers, smart speakers, projection devices, tactile electronic displays, virtual reality headsets, augmented reality headwear, and holographic displays.

14. The method of claim 12, wherein the serial content comprises one or more of audiovisual data, a video stream, a movie, an audio recording, a plurality of images, a podcast, an audio book, output produced by an application, and an animation.

15. The method of claim 12, wherein the serial content context is determined by one or more of acquiring context labelling of one or more segments of the serial content, classifying the serial content by natural language processing, and classifying the serial content by image recognition processing.

16. The method of claim 12, wherein the one or more serial content contexts comprise content within the serial content that generates one or more human feelings of one or more of surprise, amusement, fear, horror, anger, rage, disgust, annoyed, contempt, sadness, joy, confusion, interest, boredom, calmness, anxiety, anticipation, envy, sexual desire, love, and friendship.

17. The method of claim 12, wherein the virtual agent is generated as one or more of one or more displayed cartoon characters, displayed animals, displayed persons, displayed avatars, displayed icons, projected holograms, robots, and animated toys delivered simultaneously on all of the output devices.

18. The method of claim 12, wherein the processor is instantiated with an artificial intelligence.

19. The method of claim 12, further comprising, upon determining that the one or more serial content contexts match one or more predetermined contexts, determining by the one or more processors, one or more ensuing serial content contexts after pausing the displaying of the serial content.

20. The method of claim 12, further comprising:
acquiring from the interaction with the one or more humans, interaction data from one or more sensors;
classifying from the interaction data, using one or more processors, one or more content reactions by the one or more humans; and
initiating, by the virtual agent generated on the output devices using the one or more processors, one or more additional interactions with the one or more humans based on the one or more content reactions.

21. The method of claim 12, wherein the one or more serial content contexts comprise scenes or events within the serial content that generate one or more human feelings or reactions and wherein the conversation relates to the one or more human feelings or reactions.

22. A system to encourage human engagement, comprising:
a plurality of electronic devices, each electronic device comprising a processor, an output device operatively coupled to the processor, and a sensor operatively coupled to the processor for monitoring reactions of a user of the electronic device,
wherein the electronic devices are configured for:
delivering, substantially simultaneously on output devices of all of the electronic devices, serial content for users of all of the electronic devices to view as a group;
detecting, by one or more of one or more processors of the electronic devices and one or more sensors of the electronic devices, a pause indication related to emotional or facial reactions of one or more of the users to the serial content;
pausing, substantially simultaneously on all of the output devices, the delivering of the serial content based on the pause indication;
determining, by the one or more processors, one or more serial content contexts related to the serial content coincident with the pausing of the delivering of the serial content; and
generating a virtual agent as a displayed character with voice that is presented substantially simultaneously on all of the output devices using the one or more processors, the virtual agent initiating an interaction including a conversation between the virtual agent and one or more of the users based on the one or more serial content contexts.

* * * * *